US011274807B2

(12) United States Patent
Kaehler et al.

(10) Patent No.: US 11,274,807 B2
(45) Date of Patent: *Mar. 15, 2022

(54) INTEGRATING POINT SOURCE FOR TEXTURE PROJECTING BULB

(71) Applicant: Magic Leap, Inc., Plantation, FL (US)

(72) Inventors: Adrian Kaehler, Los Angeles, CA (US); Gary Bradski, Palo Alto, CA (US)

(73) Assignee: Magic Leap, Inc., Plantation, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/841,429

(22) Filed: Apr. 6, 2020

(65) Prior Publication Data

US 2020/0232622 A1 Jul. 23, 2020

Related U.S. Application Data

(63) Continuation of application No. 16/407,030, filed on May 8, 2019, now Pat. No. 10,612,749, which is a (Continued)

(51) Int. Cl.
F21V 21/00 (2006.01)
F21V 3/02 (2006.01)
(Continued)

(52) U.S. Cl.
CPC .............. *F21V 3/02* (2013.01); *F21K 9/68* (2016.08); *F21V 19/006* (2013.01);
(Continued)

(58) Field of Classification Search
CPC ........... F21K 9/68; F21K 9/66; H04N 13/395; H04N 13/128; H04N 13/253; F21V 3/02; F21V 19/006
(Continued)

(56) References Cited

U.S. PATENT DOCUMENTS 1,239,371 A * 9/1917 Evans ................... H01J 61/025
313/113
2,859,369 A * 11/1958 Williams et al. ........ H01K 1/32
313/113
(Continued)

FOREIGN PATENT DOCUMENTS

JP 60-202411 A 10/1985
JP 06-150701 5/1994
(Continued)

OTHER PUBLICATIONS

European Extended Search Report, re EP Application No. 17810670.4, dated Nov. 29, 2019.
(Continued)

*Primary Examiner* — Laura K Tso
(74) *Attorney, Agent, or Firm* — Knobbe, Martens, Olson & Bear, LLP

(57) ABSTRACT

A texture projecting light bulb includes an extended light source located within an integrator. The integrator includes at least one aperture configured to allow light to travel out of the interior of the integrator. In various embodiments, the interior of the integrator may be a diffusely reflective surface and the integrator may be configured to produce a uniform light distribution at the aperture to approximate a point source. The integrator may be surrounded by a light bulb enclosure. In various embodiments, the light bulb enclosure may include transparent and opaque regions configured to project a structured pattern of visible and/or infrared light.

21 Claims, 10 Drawing Sheets

Related U.S. Application Data continuation of application No. 15/489,524, filed on Apr. 17, 2017, now Pat. No. 10,337,691.

(60) Provisional application No. 62/348,634, filed on Jun. 10, 2016.

(51) Int. Cl.

| | | |
|---|---|---|
| *H04N 13/128* | (2018.01) | |
| *H04N 13/254* | (2018.01) | |
| *H04N 13/344* | (2018.01) | |
| *H04N 13/395* | (2018.01) | |
| *F21K 9/68* | (2016.01) | |
| *F21V 19/00* | (2006.01) | |
| *H04N 13/383* | (2018.01) | |

(52) U.S. Cl.
CPC ......... *H04N 13/128* (2018.05); *H04N 13/254* (2018.05); *H04N 13/344* (2018.05); *H04N 13/395* (2018.05); *H04N 13/383* (2018.05)

(58) Field of Classification Search
USPC ............ 362/16, 311.01, 311.14, 311.13, 310
See application file for complete search history.

(56) References Cited

U.S. PATENT DOCUMENTS

| | | | |
|---|---|---|---|
| 4,346,323 A * | 8/1982 | Hirschfeld | H01K 1/325 313/111 |
| 5,276,763 A | 1/1994 | Gobel et al. | |
| 5,382,805 A | 1/1995 | Fannon et al. | |
| 5,749,646 A | 5/1998 | Brittell | |
| 6,850,221 B1 | 2/2005 | Tickle | |
| 7,106,002 B1 | 9/2006 | Lang et al. | |
| 7,331,690 B2 * | 2/2008 | Schmidt | B60Q 1/14 362/293 |
| 7,433,024 B2 | 10/2008 | Garcia et al. | |
| 8,208,719 B2 | 6/2012 | Gordon et al. | |
| 8,494,252 B2 | 7/2013 | Freedman et al. | |
| 8,950,867 B2 | 2/2015 | Macnamara | |
| 9,081,426 B2 | 7/2015 | Armstrong | |
| 9,194,541 B2 | 11/2015 | Lin et al. | |
| 9,215,293 B2 | 12/2015 | Miller | |
| 9,255,666 B2 | 2/2016 | Yao et al. | |
| 9,310,559 B2 | 4/2016 | Macnamara | |
| 9,348,143 B2 | 5/2016 | Gao et al. | |
| D758,367 S | 6/2016 | Natsume | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| 9,740,006 B2 | 8/2017 | Gao | |
| 9,791,700 B2 | 10/2017 | Schowengerdt et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 10,337,691 B2 * | 7/2019 | Kaehler | F21V 19/006 |
| 10,612,749 B2 * | 4/2020 | Kaehler | H04N 13/128 |
| 2006/0028436 A1 | 2/2006 | Armstrong | |
| 2007/0081123 A1 | 4/2007 | Lewis | |
| 2009/0295266 A1 | 12/2009 | Ramer et al. | |
| 2012/0127062 A1 | 5/2012 | Bar-Zeev et al. | |
| 2012/0162549 A1 | 6/2012 | Gao et al. | |
| 2013/0010465 A1 | 1/2013 | Wang | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2013/0327929 A1 | 12/2013 | Ohkubo et al. | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0267420 A1 | 9/2014 | Schowengerdt | |
| 2014/0306866 A1 | 10/2014 | Miller et al. | |
| 2015/0016777 A1 | 1/2015 | Abovitz et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0243100 A1 | 8/2015 | Abovitz et al. | |
| 2015/0268415 A1 | 9/2015 | Schowengerdt et al. | |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2017/0356620 A1 | 12/2017 | Kaechler et al. | |

FOREIGN PATENT DOCUMENTS

| | | |
|---|---|---|
| JP | 2012-094302 | 5/2012 |
| JP | 2013-105748 | 5/2013 |
| KR | 2005-0071617 | 7/2005 |
| KR | 2006-0051000 | 5/2006 |
| KR | 2011-0128411 | 11/2011 |
| WO | WO 2013/054379 | 4/2013 |
| WO | WO 2017/213753 | 12/2017 |

OTHER PUBLICATIONS

International Search Report and Written Opinion for PCT Application No. PCT/US2017/027984, dated Jun. 26, 2017.
International Preliminary Report on Patentability for PCT Application No. PCT/US2017/027984, dated Dec. 11, 2018.
"Core Technology", Mantis Vision, printed Feb. 24, 2017, in 4 pages. URL: http://www.mantis-vision.com/technology.php.
"Kinect Sensor", Microsoft Corporation, 2012, printed Apr. 11, 2016, in 5 pages. URL: https://msdn.microsoft.com/enus/library/hh438998(d=printer).asp.
"Technical Guide—Integrating Sphere Theory and Applications", Labsphere, Apr. 2008, in 22 pages. URL: https://www.labsphere.com/site/assets/files/2551/a-guide-to-integrating-sphere-theory-and-applications.pdf.
American National Standard Lighting Group: "Gauges for Electric Lamp Bases and Lampholders", 2007, in 134 pages. URL: http//:www.wangd.com.
Wikipedia: "Integrating sphere", Wikipedia, printed Apr. 11, 2016, in 4 pages. URL: https://en.wikipedia.org/wiki/Integrating_sphere.
ARToolKit: https://web.archive.org/web/20051013062315/http://www.hitl.washington.edu:80/artoolkit/documentation/hardware.htm, archived Oct. 13, 2005.
Azuma, "a Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

\* cited by examiner

INTEGRATING POINT SOURCE FOR TEXTURE PROJECTING BULB

CROSS-REFERENCE TO RELATED APPLICATIONS

This non-provisional patent application is a continuation of U.S. patent application Ser. No. 16/407,030, filed on May 8, 2019, entitled "INTEGRATING POINT SOURCE FOR TEXTURE PROJECTING BULB," which is a continuation of U.S. patent application Ser. No. 15/489,524, filed on Apr. 17, 2017, entitled "INTEGRATING POINT SOURCE FOR TEXTURE PROJECTING BULB," now U.S. Pat. No. 10,337,691, which claims priority under 35 U.S.C. § 119(e) from U.S. Provisional Application No. 62/348,634, filed on Jun. 10, 2016, entitled "INTEGRATING POINT SOURCE FOR TEXTURE PROJECTING BULB," all of which are hereby incorporated by reference herein in their entirety and for all purposes.

FIELD

The present disclosure relates to texture projecting light bulbs and more particularly to approximating point sources of light within a texture projecting light bulb.

BACKGROUND

In the computer vision context, many algorithms rely on the presence of visible texture to operate reliably. For example, algorithms involving stereoscopy may rely on texture for stereoscopic matching and/or for disparity computation. Algorithms using visual tracking or local "keypoints" may also rely on texture. However, many features of the real world, such as various man-made portions of the real world, may lack the necessary visual texture for the operation of such algorithms.

In some computer vision applications, texture projection, also referred to as structured light projection, may be used to provide visual texture for computer vision systems. For example, "RGB-D" cameras, which measure depth in addition to light intensity, may image the world based on structured light projection. Typically, structured light projection subsystems may be integrated with imaging subsystems, especially in systems requiring detailed calibration of the geometrical relationship between the projection and imaging subsystems. Systems and methods disclosed herein address various challenges related to structured light projection.

SUMMARY

Examples of texture projecting light bulbs with integrating point sources are disclosed.

In one aspect, a texture projecting light bulb is described. The light bulb comprises an incandescent filament configured to produce infrared light, an integrating sphere enclosing the incandescent filament, and a light bulb enclosure surrounding the integrating sphere. The integrating sphere comprises a diffusely reflective interior surface and an aperture configured to allow light to pass out of the integrating sphere. The enclosure comprises one or more regions transmissive to infrared light and one or more regions opaque to infrared light. The one or more transmissive regions are configured to project a structured light pattern of infrared light detectable by a computer vision system.

In another aspect, a texture projecting light bulb is described. The light bulb comprises a light source, an integrator surrounding the light source, and an enclosure surrounding the integrator. The integrator comprises an interior surface and at least one aperture. At least a portion of the enclosure is translucent.

In some embodiments, the light source may be configured to produce infrared light. The light source may be configured to produce visible light. The light source may be configured to produce a combination of infrared and visible light. The integrator may comprise an integrating sphere. The integrator may comprise an integrating cube. The interior surface of the integrator may comprise a specularly reflective material. The interior surface of the integrator may be at least partially coated with a specularly reflective material. The interior surface of the integrator may comprise a diffusive material. The interior surface of the integrator may be at least partially coated with a diffusive coating. The extended light source may comprise an incandescent filament. The extended light source may comprise a light-emitting diode. The extended light source may comprise a gas-discharge element. The extended light source may comprise an arc light. At least a portion of the enclosure may comprise a hot mirror. At least a portion of the enclosure may be opaque. At least a portion of the interior surface of the enclosure may be capable of absorbing light. The translucent portion of the enclosure may be configured to project a structured light pattern. At least a portion of the enclosure may be spherical. The aperture of the integrator may be located at the center of the spherical portion of the enclosure. The light bulb may further comprise a base configured to be mechanically and electrically connected to a light bulb socket. The base may comprise a threaded base. The light bulb may further comprise a baffle disposed at least partially within the integrator. At least a portion of the baffle may be located along a straight line path between the light source and the aperture. The baffle may intersect every straight line path between the light source and the aperture. The baffle may comprise a specularly reflective surface. The baffle may comprise a diffusely reflective surface.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Texture Projecting Bulb

In some texture projection systems, it may be desirable to use a structured light projection subsystem separate from imaging subsystems. For example, a structured light projection device may include a light bulb-like device. In some embodiments, the light bulb-like device may be capable of screwing into and deriving power from a standard light bulb socket, such as in a home, workplace, or other environment. When powered, the light bulb-like device may serve as a projector of texture into the space in which it is installed. For example, the device may be configured to project a pattern of light, such as a grid, a series of point-like images, horizontal or vertical bars, or other detectable pattern. In various embodiments, the structured light pattern may be projected in the infrared spectrum, in the visible light spectrum, or in any other suitable wavelength or range of wavelengths of electromagnetic radiation.

Figure 1A:
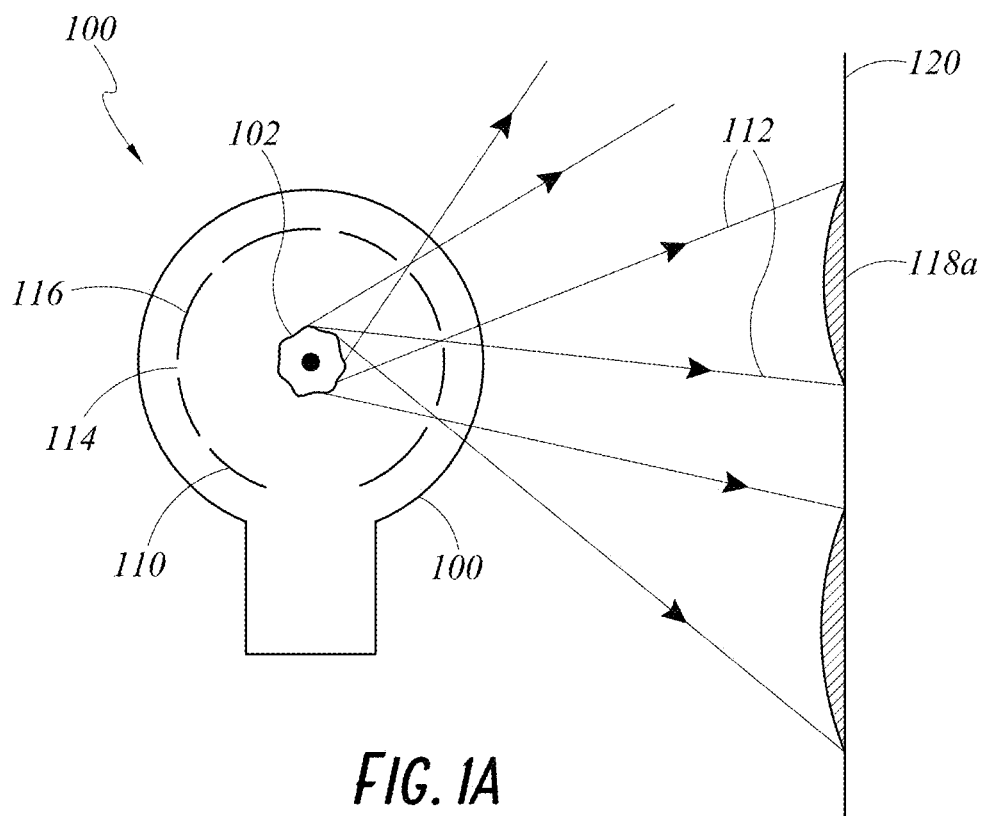
FIG. 1A schematically illustrates an example of a texture projecting light bulb including an extended light source.
Figure 1B:
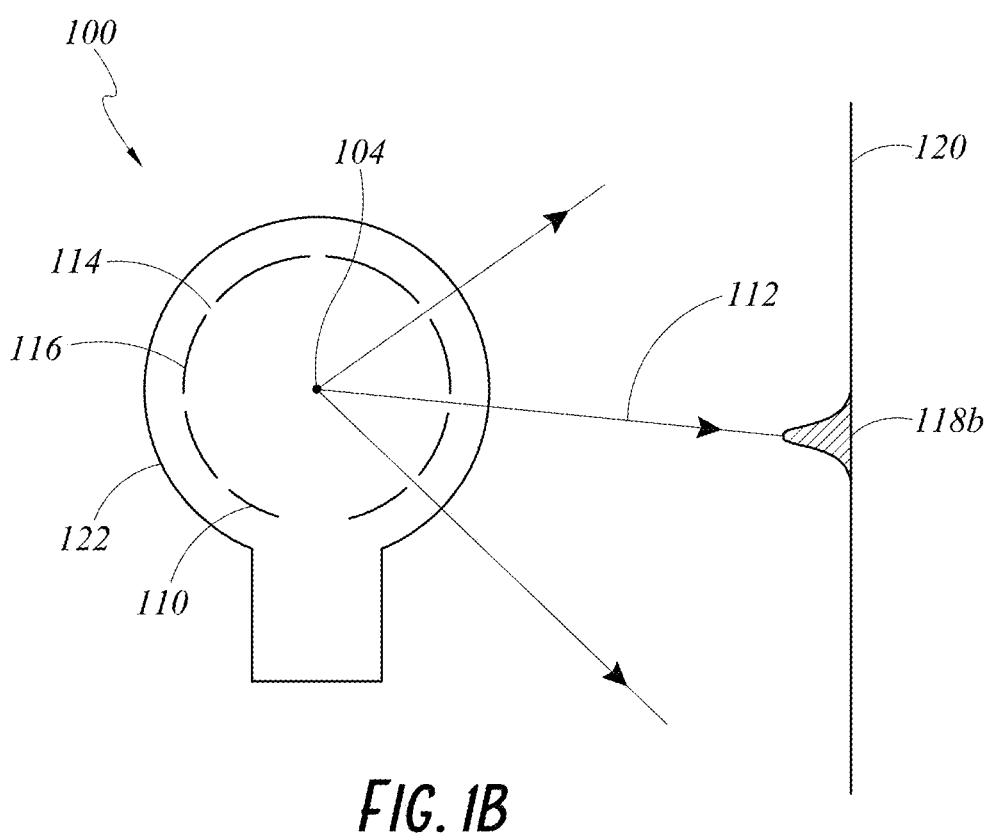
FIG. 1B schematically illustrates an example of a texture projecting light bulb including an ideal point light source.

FIGS. 1A and 1B depict example configurations of texture projecting bulbs 100 configured to produce a structured light pattern by projecting light through a pattern generating element 110. Light rays 112 may travel from a light source 102 through transmissive regions 114 of the pattern generating element 110. Light rays 112 may be blocked (e.g., absorbed or reflected) by non-transmissive regions 116 of the pattern generating element 110. The transmissive regions 114 of the pattern generating element 110 may be configured such that the light rays 112 passing through the transmissive regions 114 create one or more images 118 on an external surface 120. The bulb 100 may be enclosed by a light bulb enclosure 122. The light bulb enclosure 122 may be at least partially transparent or translucent. For example, the enclosure 122 may be a substantially spherical glass enclosure.

In some embodiments, the pattern generating element 110 comprises a portion of the enclosure 122. For example, the pattern generating element 110 may include transmissive and non-transmissive regions of the enclosure 122. Transmissive and non-transmissive regions of an enclosure 122 may be produced by methods such as printing or depositing non-transmissive materials onto an inner or outer surface of an otherwise transmissive enclosure 122 (e.g., clear glass or other transparent or translucent materials). In other embodiments, the pattern generating element 110 may be separate from the enclosure 122. For example, the pattern generating element 110 may be an enclosure surrounding the light source 102 adjacent to or spaced from the enclosure 122.

The pattern generating element 110 may include any of various metals or other materials opaque to at least a portion of the electromagnetic spectrum. In some embodiments, the non-transmissive regions 116 of the pattern generating element 110 may be generally opaque to most or all wavelengths of the spectrum emitted by the light source 102. In other embodiments, the non-transmissive regions 116 of the pattern generating element 110 may be selectively opaque to only a desired portion of the spectrum. For example, the non-transmissive regions 116 may include a "hot mirror" material or other material opaque to infrared wavelengths, but transparent to visible light, while the transmissive regions 114 may include clear glass or other material transparent to both infrared and visible light. Thus, visible light can pass through the entire surface of the bulb, while infrared light may pass through only the transmissive regions 114. Such combination of selectively transmissive and non-transmissive regions 114, 116 can produce a bulb configured to illuminate a room with visible light and appear to be an ordinary light bulb, while projecting a structured light pattern of infrared light detectable by machine vision devices but invisible to human eyes.

The texture projecting bulb 100 depicted in FIG. 1A includes an extended light source 102, while the bulb 100 of FIG. 1B includes an ideal point light source 104. A point source 104 differs from an extended source 102 because the size (e.g., length, width, cross-sectional area) of a point source 104 is negligible relative to the size of the bulb. An extended light source (e.g., an incandescent filament), has a non-negligible size. For example, an extended light source may have a size that is a fraction of the size (e.g., diameter) of the transmissive enclosure 122, with the fraction being 0.1, 0.2, 0.3, or more. A point source 104 may be desirable for use in a texture projecting bulb 100. As shown in FIG. 1A, light rays 112 projecting from an extended light source 102, through a transparent region 114 of the pattern generating element 110 may be traveling at an array of angles, resulting in a diffuse image 118a that may be difficult for a computer vision system to detect. If a point source 104 is used as in FIG. 1B, light rays 112 exiting each transparent region 114 of the pattern generating element 110 are traveling at the same angle (or a very small range of angles, such as within 1°, 0.5°, 0.1°, or less), resulting in a substantially collimated beam creating a more sharply defined image 118b which may be more readily detected by a computer vision system.

Light sources used for light bulbs are typically extended light sources, rather than point sources which may be desired for texture projection applications. For example, incandescent bulbs have a filament that can have a substantial size relative to the size of the bulb, and light may be emitted by most or all of the filament. Light-emitting diodes, while smaller than some incandescent filaments, are still typically extended light sources too large to function as a point light source 104 for texture projecting bulb applications. Thus, projecting texture with a light bulb-like device may be improved and/or facilitated by an element capable of producing a point-like light source using the light from an extended light source. Example systems and methods for approximating a point light source are discussed below with reference to FIGS. 2-4I.

Integrating Point Source

Figure 2:
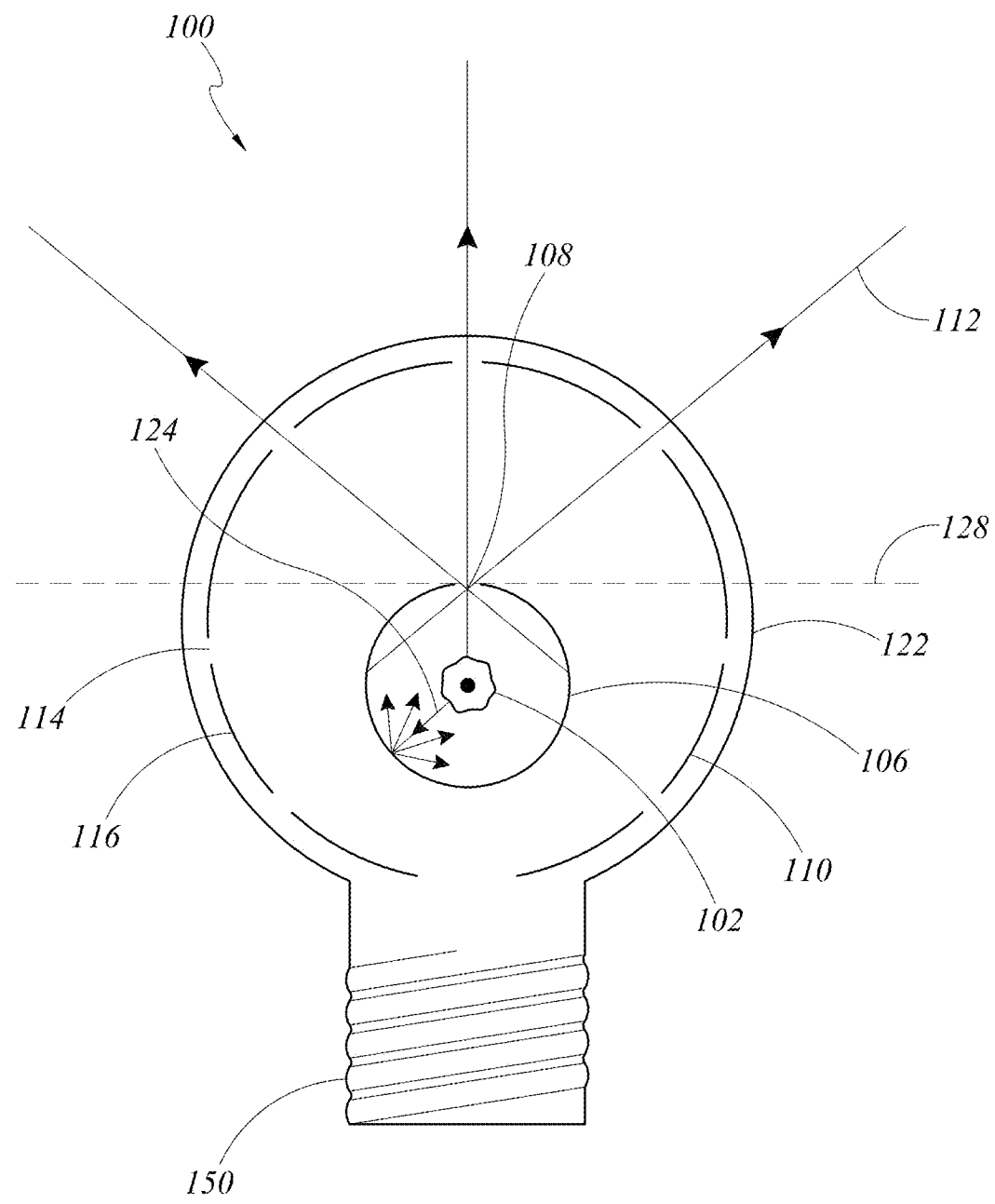
FIG. 2 schematically illustrates an example of a spherical texture projecting light bulb including an extended light source within an integrator near the center of the light bulb.

The light emitted by an extended light source can be guided to approximate a point light source by placing the extended light source within an integrator. FIG. 2 schematically illustrates a texture projecting bulb 100 including an extended light source 102 within an integrator 106 configured to approximate a point light source at the center of the bulb 100. Similar to the embodiments depicted in FIGS. 1A and 1B, the texture projecting bulb 100 includes an enclosure 122 and a pattern generating element 110 (including transmissive portions 114 and non-transmissive portions 116) surrounding an extended light source 102. The bulb 100 includes a base 150 configured to permit the bulb 100 to be connected (e.g., mechanically and electrically) to a matching socket in a lamp (e.g., by screwing a threaded metal base into a corresponding female socket in the lamp). For example, the light bulb 100 can have a standard-gauge threaded base 150 (e.g., E26) as described in the American National Standards Institute (ANSI) C81.63 standard, which advantageously enables the bulb-like device to be used with conventional lamps.

The bulb 100 additionally includes an integrator 106 disposed within the enclosure 122 and pattern generating element 110, and surrounding the light source 102, so as to approximate a point light source. The integrator 106 internally reflects and/or diffuses all or substantially all of the light generated by the light source. The integrator 106 further includes an aperture 108 configured to permit the passage of light rays 112 out of the integrator 106. The aperture 108 is the only location at which light may leave the integrator. Thus, a small aperture 108 may emit light in substantially the same manner as a point source. For example, the area of the aperture may be equal to the area of the integrator multiplied by a relatively small port fraction, such as 0.2, 0.1, 0.05, 0.025, 0.01, or smaller.

The integrator 106 may be any suitable shape, such as a sphere, ellipsoid, cube, tetrahedron, or any other three-dimensional shape defining an interior volume in which light can be reflected. The interior surface of the integrator 106 may be selected so as to reflect all or substantially all of the light emitted by the light source 102. In some embodiments, the interior surface may be a diffusely reflective surface (e.g., a diffusive, Lambertian or "matte" surface). In a diffusely reflective integrator 106, light 124 traveling from the light source 102 to the interior surface of the integrator 106 may be scattered, or reflected at a variety of angles. In other embodiments, the interior surface of the integrator 106 may reflect light in a specular manner, or in a combination of diffuse and specular reflection. In various embodiments, the desired reflection characteristics may be achieved by coating the interior surface of the integrator 106 with a material that reflects in the desired manner (e.g., a metal, a gloss or matte paint or other surface finish, or the like), or the entire integrator (or a portion thereof) may be made of a material that reflects in the desired manner. In some embodiments, the integrator 106 may be an Ulbricht sphere, a Coblentz sphere, a Sumpner box, or other device exhibiting internal diffusion and/or reflection. Example configurations of integrators are described in greater detail with reference to FIGS. 4A-4I.

In some embodiments, it may be desirable to achieve a uniform or substantially uniform luminance distribution within the integrator, which can result in a substantially uniform light output from the aperture 108, which thereby functions more like the point light source 104 shown in FIG. 1B. Uniformity of luminance distribution may be accomplished by using an integrator 106 with a relatively high sphere multiplier. The sphere multiplier, M, of an integrator can be estimated as the average number of times a photon emitted by the light source will be reflected within the integrator before escaping through the aperture 108. The sphere multiplier can also be estimated in terms of the reflectance, $\rho$, of the interior surface of the integrator and a port fraction, f, which is a ratio of the area of the aperture 108 to the total area of the integrator 106 as: $M=\rho/[1-\rho(1-f)]$. For high reflectance (e.g., $\rho$ approaching one) and a relatively small port fraction, the multiplier can be quite large, and the luminance distribution inside the integrator can be much larger than the luminance of the source 102. Greater multipliers typically provide greater uniformity of the luminance in the integrator. In various implementations, the reflectance of the interior of the integrator can be greater than 0.8, 0.9, 0.95, 0.98, or 0.99. In various implementations, the port fraction can be less than 0.2, 0.1, 0.05, 0.025, or 0.01. A suitably high sphere multiplier in some embodiments may be 5, 10, 15, 20, or greater.

The sphere multiplier may equally be used to characterize the behavior of a non-spherical integrator 106. In an integrator 106 with a relatively high sphere multiplier, the light at any point within the integrator 106 may be relatively homogeneous. Where the light within the integrator 106 is relatively homogeneous, the light at or near the aperture 108 may have a uniform luminance distribution in all directions. Light leaving the aperture 108 will generally be confined to the half-space bounded by the plane 128 tangent to the integrator 106 at the location of the aperture 108. Thus, an integrator 106 having a high sphere multiplier may produce a substantially isotropic, hemispherical luminance distribution from the aperture 108. Accordingly, the light source 102 inside an integrator 106 shown in FIG. 2 functions similarly to the texture bulb 100 having a point source shown in FIG. 1B. The example bulb 100 shown in FIG. 2 advantageously can produce relatively sharper textures, as compared to the more diffuse textures of the extended light source shown in FIG. 1A.

The light source 102 inside the integrator 106 can include an incandescent filament, a light emitting diode (LED), a gas-discharge element, an arc light, a laser diode, or any other type of light source. The spectrum of light emitted by the light source 102 can include the visible and/or the infrared portions of the electromagnetic spectrum. For example, the light source can include an infrared LED that outputs light in the range from about 700 nm to about 2000 nm, or any sub-range therein. The infrared light can be advantageous for generating the texture used by computer-vision systems (e.g., augmented reality systems, computer game systems, etc.). The use of a visible light source (that provides infrared light or in combination with a separate infrared source) can allow the bulb 100 to also be used as a visible light source for users of the computer-vision system. Accordingly, such bulbs 100 can provide conventional visible illumination for an environment while also providing invisible (e.g., infrared) texture that is viewable by the computer-vision system.

Although FIG. 2 depicts a texture projecting bulb 100 as a traditional generally spherical light bulb with a centrally located light source 102 and integrator 106, many other arrangements and/or geometries of the texture projecting bulb 100 are possible. For example, FIGS. 2 and 3A-3D illustrate various example arrangements of one or more integrators 106 within an integrating bulb 100. In the arrangement of FIG. 2, the integrator 106 is located such that the aperture 108 is at or near the geometric center of the spherical portion of the light bulb enclosure 122. Because the aperture 108 functions as a point source, the aperture may provide substantially uniform luminance in a hemisphere bounded by the plane intersecting the bulb 100 along axis 128.

Figure 3A:
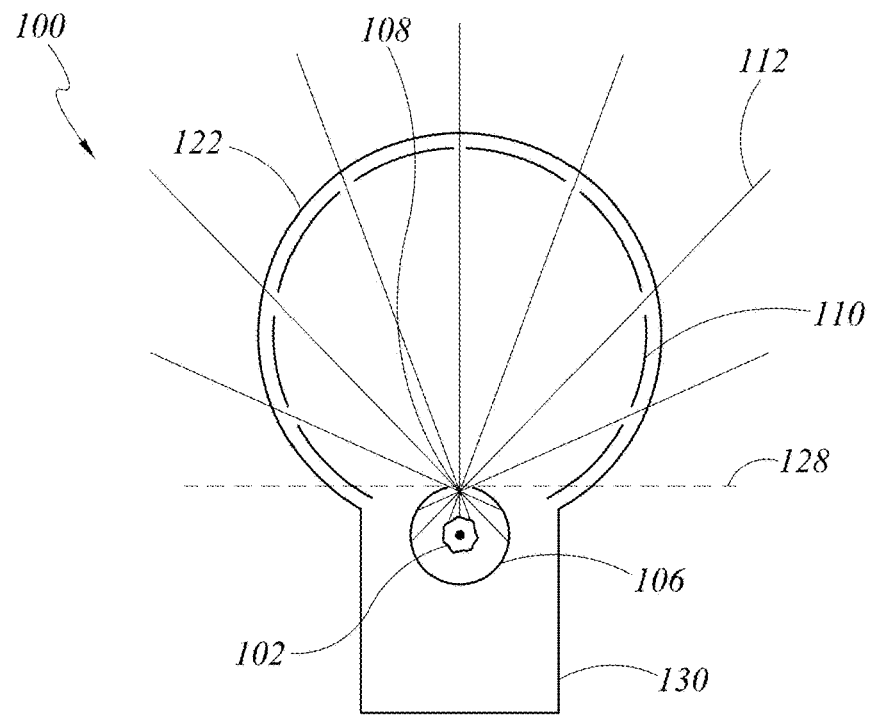
FIG. 3A schematically illustrates an example of a texture projecting light bulb including an extended light source within an integrator at a location other than the center of the light bulb.
Figure 3B:
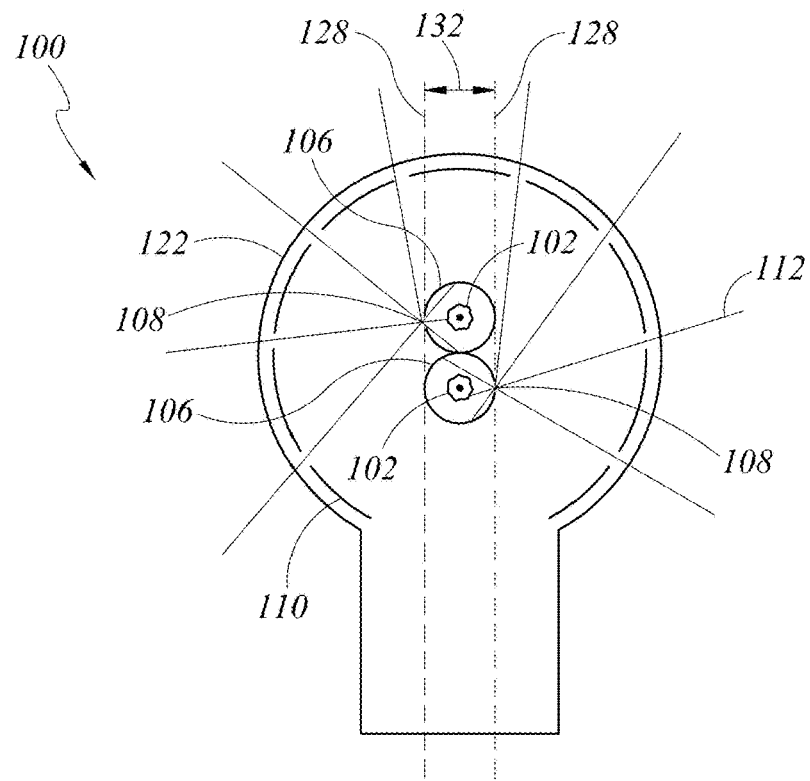
FIG. 3B schematically illustrates an example of a texture projecting light bulb including a plurality of extended light sources within integrators.
Figure 3C:
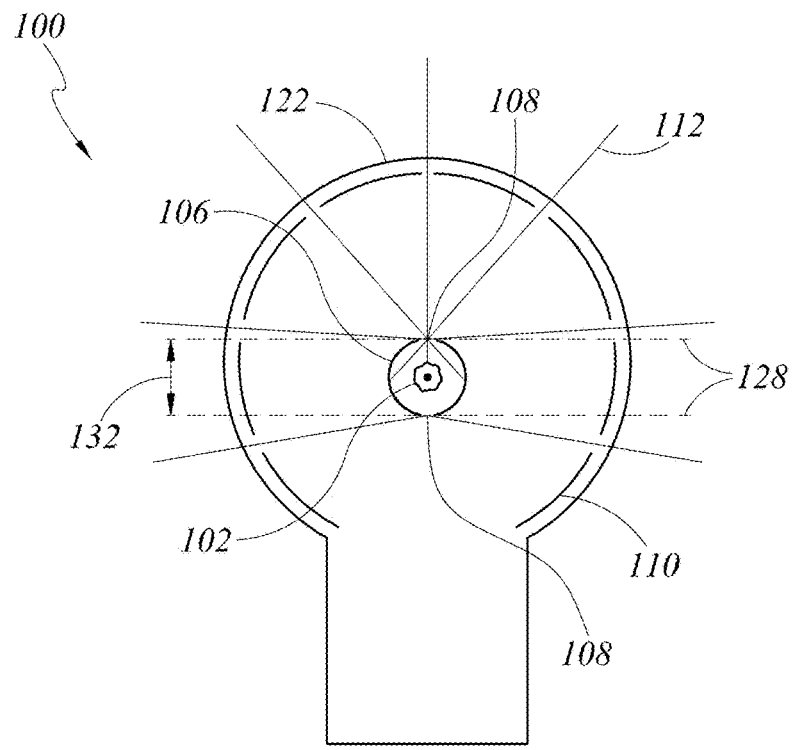
FIG. 3C schematically illustrates an example of a texture projecting light bulb including an extended light source within an integrator having a plurality of apertures.

Referring now to FIGS. 3A-3D, the integrator 106 may be located away from the geometric center of the spherical portion of the enclosure 122 in some embodiments. For example, FIG. 3A depicts a bulb 100 in which the light source 102 and integrator 106 are located near the periphery of the enclosure 122, such as in a base portion 130, so that the aperture 108 faces toward the center of the enclosure 122 and away from the base portion 130. The arrangement of FIG. 3A may allow for the projection of light rays 112 through a larger portion of the pattern generating element 110 and bulb enclosure 122.

In some embodiments, the pattern projection area may be increased by providing a plurality of light sources 102 and integrators 106 within a single bulb 100. For example, the bulb 100 depicted in FIG. 3B contains two light sources 102, each disposed within an integrator 106 having an aperture 108. To avoid overlapping luminance patterns that may distort or disrupt the projected texture, the integrators 106 may be oriented with apertures 108 facing in opposite directions such that the luminance boundary planes 128 of the two integrators 106 are substantially parallel. Such an arrangement may leave a small dark region 132 between the two half-spaces, where light is not projected from either aperture 108. The locations of the apertures can be selected such that the dark region 132 is negligible relative to the size of the illuminated space, so as to avoid disrupting the structured light pattern. In other embodiments, more than two light sources 102 and/or integrators 106 can be included.

In other embodiments, the pattern projection area may be increased by providing a single light source 102 within a single integrator 106 having a plurality of apertures 108. For example, the bulb 100 depicted in FIG. 3C contains one light source 102 within a spherical integrator 106 having two apertures 108. Because the two apertures 108 are diametrically opposed, the two illuminated half-spaces (bounded by planes 128) do not intersect, leaving a small dark region 132, as described above with reference to FIG. 3B. It is noted that a second aperture 108 provides an additional location for light to escape the interior of the integrator 106, and may thereby decrease the sphere multiplier of the integrator 106.

In some embodiments, the light bulb enclosure 122 may be spherical or non-spherical. For example, the texture projecting bulb 100 depicted in FIG. 3D has a flood light-type enclosure 122 including non-transmissive radial side portions and a circumferential transmissive portion. In a flood light-type enclosure 122, a pattern generating element 110 may be disposed along the transmissive portion of the flood light. In various embodiments, any other suitable shape of light bulb enclosure may be used to project a structured light pattern to a desired area. A non-spherical bulb enclosure 122 may also be implemented with any arrangement of one or more light sources 102 and integrators 106 described herein.

Figure 3D:
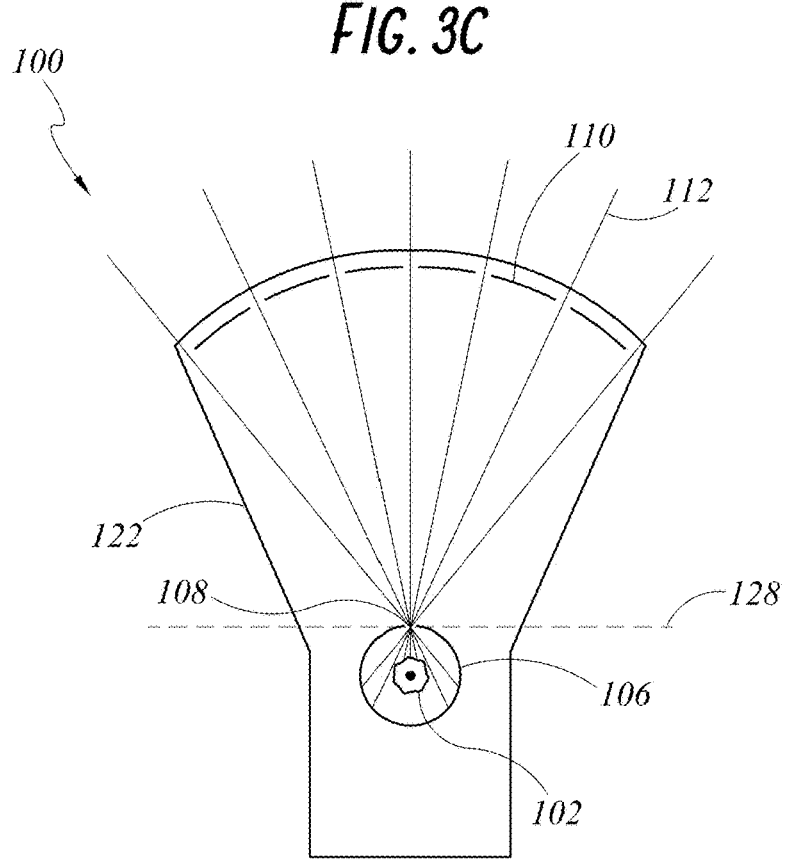
FIG. 3D schematically illustrates an example of a non-spherical texture projecting light bulb including an extended light source within an integrator.

Although FIGS. 2-3D depict each integrator 106 as a spherical integrator surrounding a single extended light source 102, many other arrangements and/or geometries of the integrator 106 and light source 102 are possible. Referring now to FIGS. 4A-4I, various configurations of extended light sources 102 and integrators 106 will be described. Each of the configurations depicted in FIGS. 4A-4I, as well as variations of the depicted configurations, can equally be implemented in the texture projecting bulbs depicted and described with reference to FIGS. 2-3D.

Figure 4A:
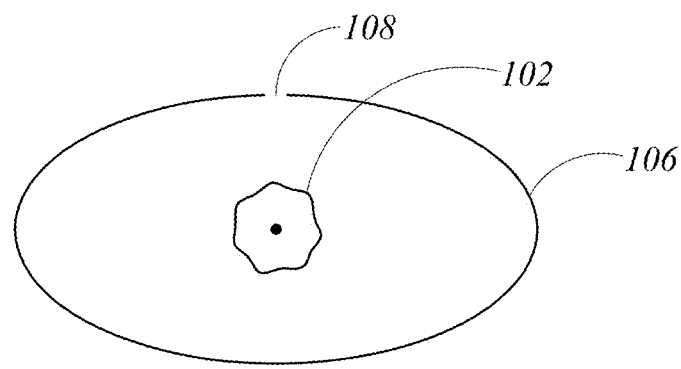
FIGS. 4A-B schematically illustrate examples of non-spherical integrators containing extended light sources.

In one example, FIG. 4A depicts an ellipsoidal integrator 106 with a light source 102 and aperture 108 consistent with the light sources and integrators described above. The light source 102 may be centered within the integrator 106, or may be located elsewhere within the interior space of the integrator 106. The aperture 108 may be located near a minor axis of the ellipsoid, near a major axis of the ellipsoid, or at any other location along the exterior of the integrator 106. For example, the ellipsoidal integrator 106 depicted in FIG. 4G includes a light source 102 located away from the center of the integrator 106, and an aperture 108 located along a major axis of the ellipse. In some embodiments, the integrator 106 may include more than one aperture.

Figure 4B:
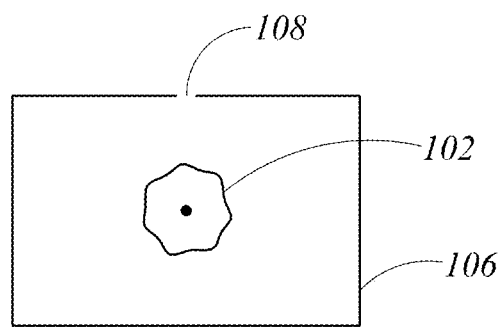

In another example configuration, FIG. 4B depicts an integrator 106 having a rectangular cross-section. For example, the integrator 106 of FIG. 4B may be a rectangular prism, a cylinder, or other three-dimensional shape with a rectangular or polygonal cross-section. Similar to the integrator depicted in FIG. 4A, the integrator 106 contains a light source 102 and includes an aperture 108. The light source 102 may be centered within the integrator 106, or may be located elsewhere within the interior space of the integrator 106. The aperture may be located along a side of the rectangle, at a corner, or at any other location along the exterior of the integrator. For example, the rectangular integrator 106 depicted in FIG. 4F includes a light source 102 located away from the center of the integrator and an aperture 108 located near a corner of the rectangle. In some embodiments, the integrator 106 may include more than one aperture.

Figure 4C:
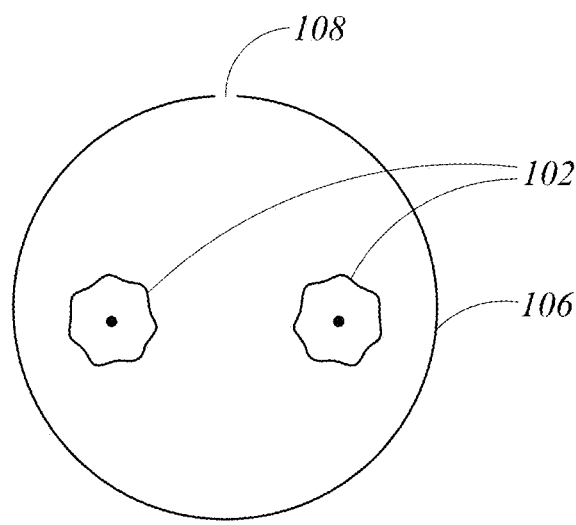
FIG. 4C schematically illustrates an example of an integrator containing a plurality of extended light sources.

In some embodiments, the integrator 106 may contain more than one light source 102. For example, the integrator 106 depicted in FIG. 4C contains two extended light sources 102. More than one light source 102 may be included within the integrator 106, for example, to increase the luminance of the texture projecting bulb. In some embodiments, light sources 102 may be sources having different luminance spectra, such that their light as combined by the integrator may have a desired spectral profile. For example, one source may emit primarily visible light and the other source may emit primarily infrared light. Although the integrator 106 of FIG. 4C is depicted as having a circular cross section, it will be appreciated that any arrangement of multiple light sources 102 within an integrator 106 may be implemented with non-spherical integrators, as described above.

Figure 4D:
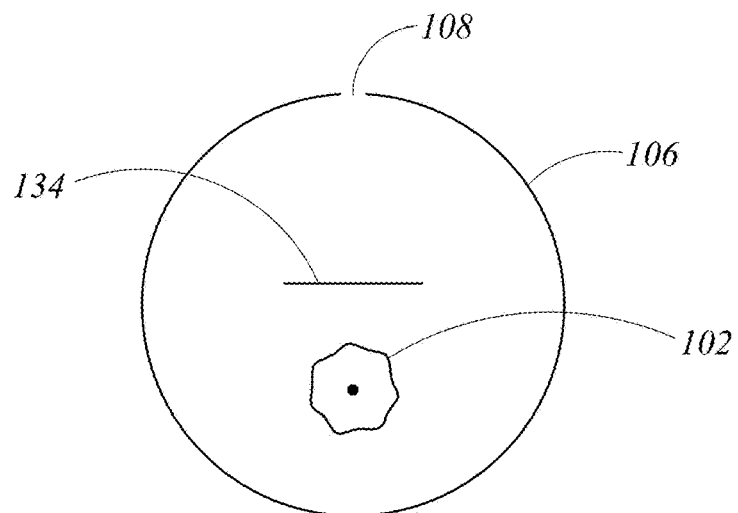
FIG. 4D schematically illustrates an example of an integrator containing an extended light source and a baffle disposed between the light source and an aperture of the integrator.
Figure 4E:
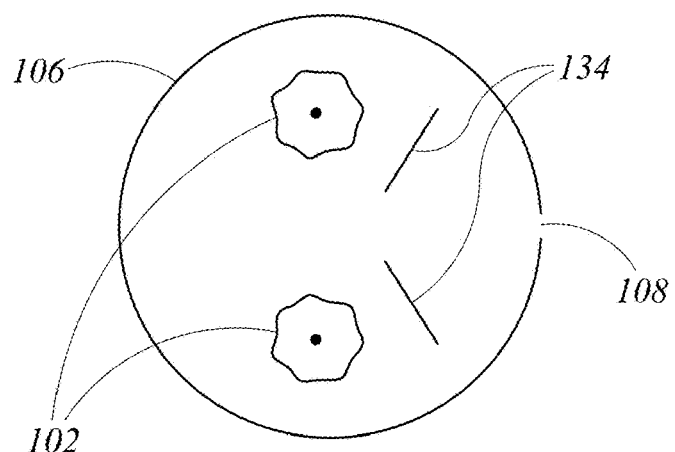
FIG. 4E schematically illustrates an example of an integrator containing a plurality of extended light sources and baffles disposed between the light sources and an aperture of the integrator.
Figure 4F:
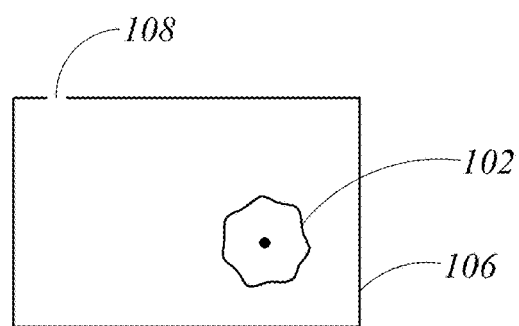
FIGS. 4F-G schematically illustrate examples of non-spherical integrators containing extended light sources.
Figure 4G:
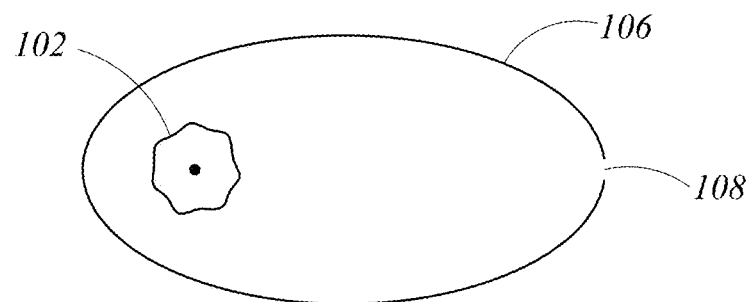
Figure 4H:
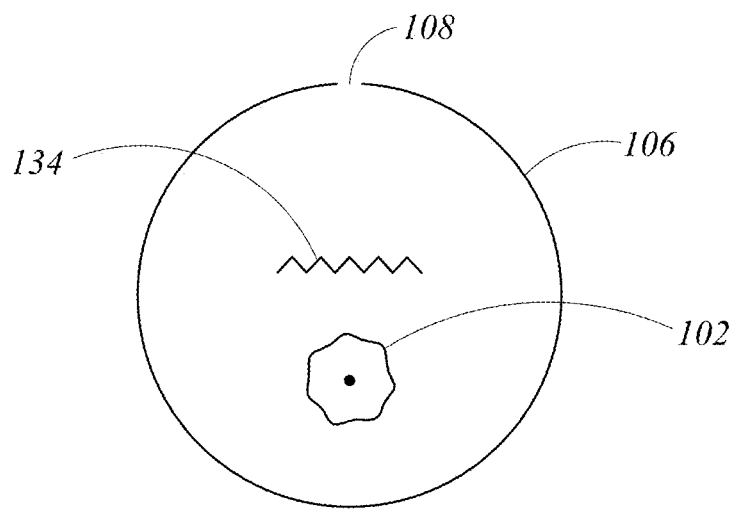
FIG. 4H schematically illustrates an example of an integrator containing an extended light source and a baffle disposed between the light source and an aperture of the integrator.
Figure 4I:
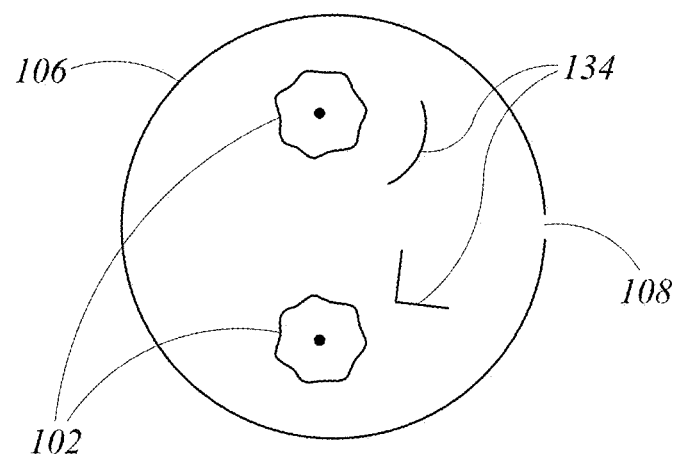
FIG. 4I schematically illustrates an example of an integrator containing a plurality of extended light sources and baffles disposed between the light sources and an aperture of the integrator.

Referring now to FIGS. 4D and 4E, some embodiments may further include one or more baffles 134 or other light-blocking structures within the integrator 106 to increase the uniformity of the light exiting the integrator 106 at an aperture 108. In the absence of a baffle, an optical path may exist directly from the light source 102 to the aperture 108. Light traveling directly from the light source 102 to the aperture 108 may reach the aperture 108 without interacting with the diffusely reflective inner surface of the integrator 106, and may thereby disrupt the otherwise uniform distribution of light at the aperture. Thus, one or more baffles 134 may be included within the integrator 106 so as to block the direct path between light sourced 102 and aperture 108. In some embodiments, the one or more baffles 134 may be made of or coated with the same diffuse or specular material as the interior surface of the integrator 106, or of a similar material. In some embodiments, a side of a baffle 134 facing a light source 102 may have a different coating from the side of the baffle 134 facing an aperture 108 (e.g., one side may be specularly reflective and one side may be diffusely reflective). For example, FIG. 4D depicts an integrator 106 containing an extended light source 102 and a baffle 134 located between the light source 102 and the aperture 108 to prevent light from traveling directly from the light source 102 to the aperture 108. Similarly, FIG. 4E depicts an integrator 106 containing two extended light sources 102 and two baffles 134, each baffle 134 located between a light source 102 and the aperture 108, to prevent light from traveling directly from the light sources 102 to the aperture 108. Moreover, baffles 134 may be generally linear in cross section, as depicted in FIGS. 4D and 4E, or may have other shapes including curves and/or angles, such as the baffles 134 depicted in FIGS. 4H and 4I.

Although the integrators 106 of FIGS. 4D and 4E are depicted as having circular cross sections, any arrangement of one or more light sources 102 and baffles 134 within an integrator 106 may be implemented with non-spherical integrators, as described above. In addition, some embodiments may incorporate one or more extended light sources 102 located outside an integrator 106, with light from the source 102 entering the integrator 106 through an additional aperture. The elements, arrangements, and other features of the embodiments depicted in FIGS. 2-4E may be used independently of one another. Thus, any combination or subcombination of elements, arrangements, or other features depicted and/or described with reference to any of FIGS. 2-4E may be implemented without departing from the spirit or scope of this disclosure.

3D Display

The structured light projection systems and methods described above may be implemented for various machine vision applications. For example, in virtual reality (VR) or augmented reality (AR) systems, a wearable device may be configured to detect a structure light pattern such as the patterns described elsewhere herein so as to detect the presence of objects or boundaries in the world around a user. For example, an embodiment of the bulb 100 can be connected to a lamp in the user's environment and used to project texture onto surfaces and objects in the environment for detection and processing by a computer-vision system associated with the AR system (or a gaming system). Based on detected objects or boundaries, a wearable system may provide a VR or AR experience, such as by projecting a three-dimensional rendering of the world to the wearer, or allowing light from the world to pass to the eyes of the wearer while adding virtual objects to the wearer's view of the world. In some implementations, the wearer may be presented with an AR experience in which virtual objects interact with real objects viewable by the wearer, an experience also referred to as mixed reality. Example embodiments of display systems compatible with the texture projecting bulbs as discussed above will now be described.

In order for a three-dimensional (3D) display to produce a true sensation of depth, and more specifically, a simulated sensation of surface depth, it is desirable for each point in the display's visual field to generate the accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR and AR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed elsewhere herein, such depth cues provide credible perceptions of depth.

Figure 5:
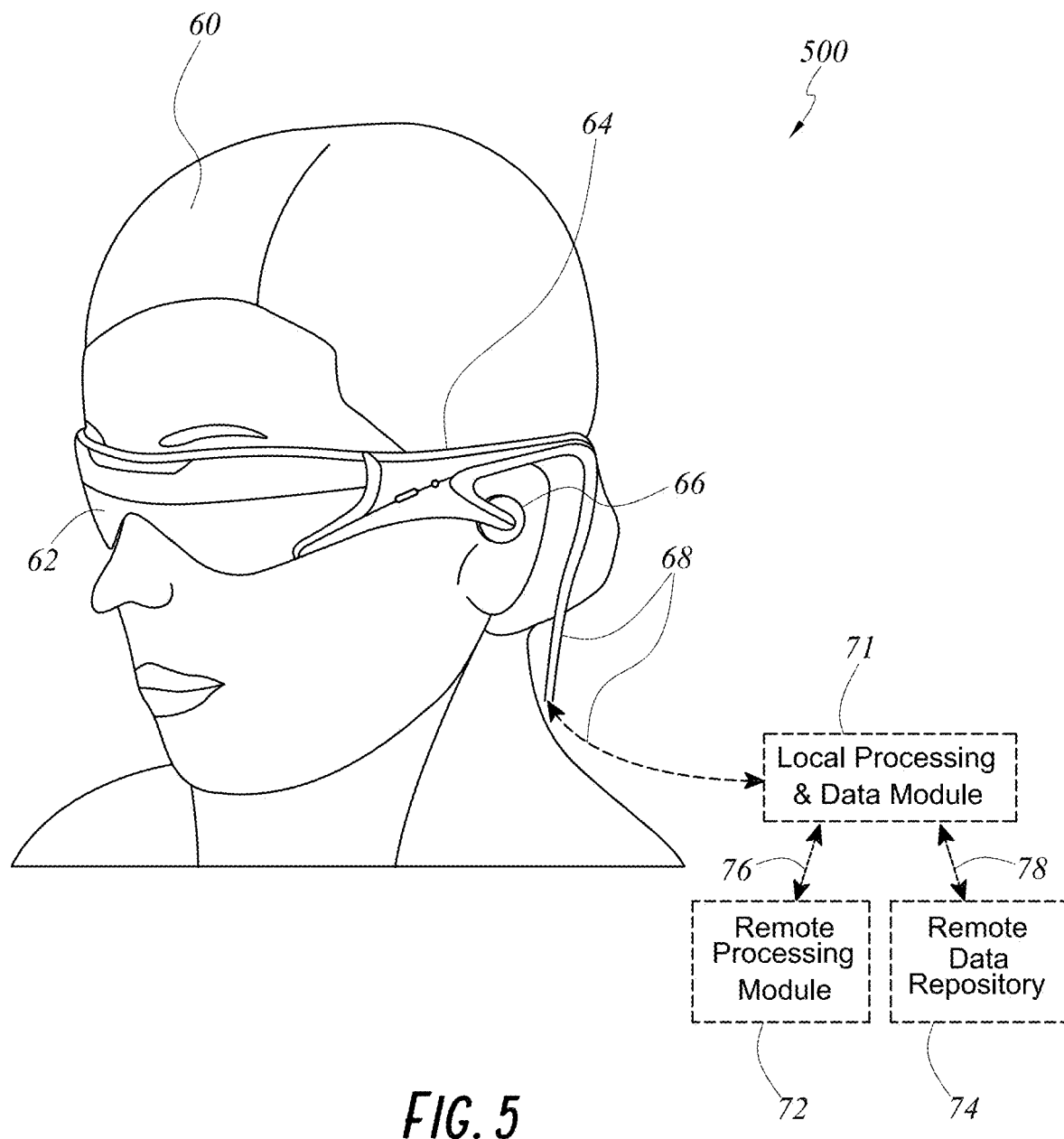
FIG. 5 illustrates an example of a wearable display system.

FIG. 5 illustrates an example of wearable display system 500. The display system 500 includes a display 62, and various mechanical and electronic modules and systems to support the functioning of display 62. The display 62 may be coupled to a frame 64, which is wearable by a display system user, wearer, or viewer 60 and which is configured to position the display 62 in front of the eyes of the user 60. The display system 500 can comprise a head mounted display (HMD) that is worn on the head of the wearer. An augmented reality device (ARD) can include the wearable display system 500. In some embodiments, a speaker 66 is coupled to the frame 64 and positioned adjacent the ear canal of the user (in some embodiments, another speaker, not shown, is positioned adjacent the other ear canal of the user to provide for stereo/shapeable sound control). The display system 500 can include an outward-facing imaging system which observes the world in the environment around the wearer (see, e.g., the imaging system 502 shown in FIG. 7). The display system 500 can also include an inward-facing imaging system which can track the eye movements of the wearer (see, e.g., the imaging system 500 shown in FIG. 7). The inward-facing imaging system may track either one eye's movements or both eyes' movements. In some embodiments, the display system 500 can also include an outward-facing imaging system which can image the world around the wearer and detect structured light patterns projected on surfaces in the vicinity of the wearer. The display 62 can be operatively coupled 68, such as by a wired lead or wireless connectivity, to a local data processing module 71 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration).

The local processing and data module 71 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 64 or otherwise attached to the user 60), such as image capture devices (e.g., cameras), microphones, inertial measurement units (IMUs), accelerometers, compasses, global positioning system (GPS) units, radio devices, and/or gyroscopes; and/or b) acquired and/or processed using remote processing module 72 and/or remote data repository 74, possibly for passage to the display 62 after such processing or retrieval. The local processing and data module 71 may be operatively coupled by communication links 76 and/or 78, such as via wired or wireless communication links, to the remote processing module 72 and/or remote data repository 74 such that these remote modules are available as resources to the local processing and data module 71. In addition, remote processing module 72 and remote data repository 74 may be operatively coupled to each other.

In some embodiments, the remote processing module 72 may comprise one or more hardware processors configured to analyze and process data and/or image information. In some embodiments, the remote data repository 74 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (e.g., rotational movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic or comfortable simulations of three-dimensional imagery.

Figure 6:
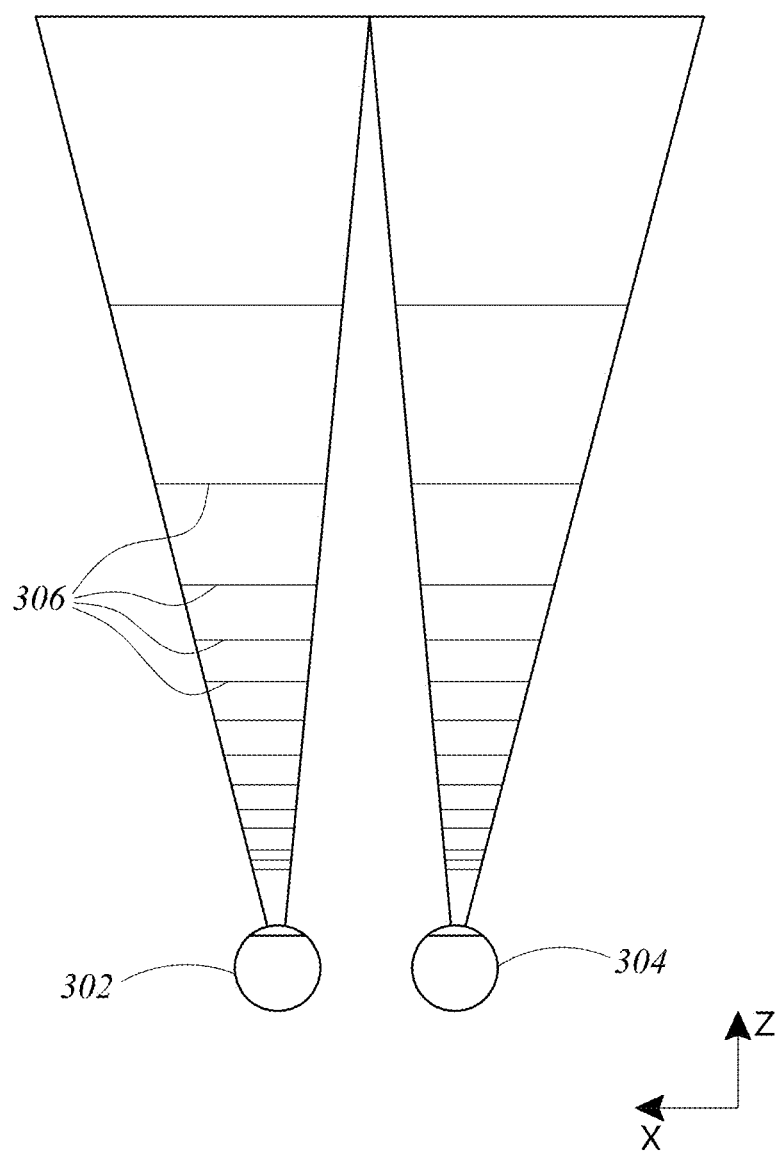
FIG. 6 illustrates aspects of an approach for simulating three-dimensional imagery using multiple depth planes.

FIG. 6 illustrates aspects of an approach for simulating three-dimensional imagery using multiple depth planes. With reference to FIG. 6, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 7:
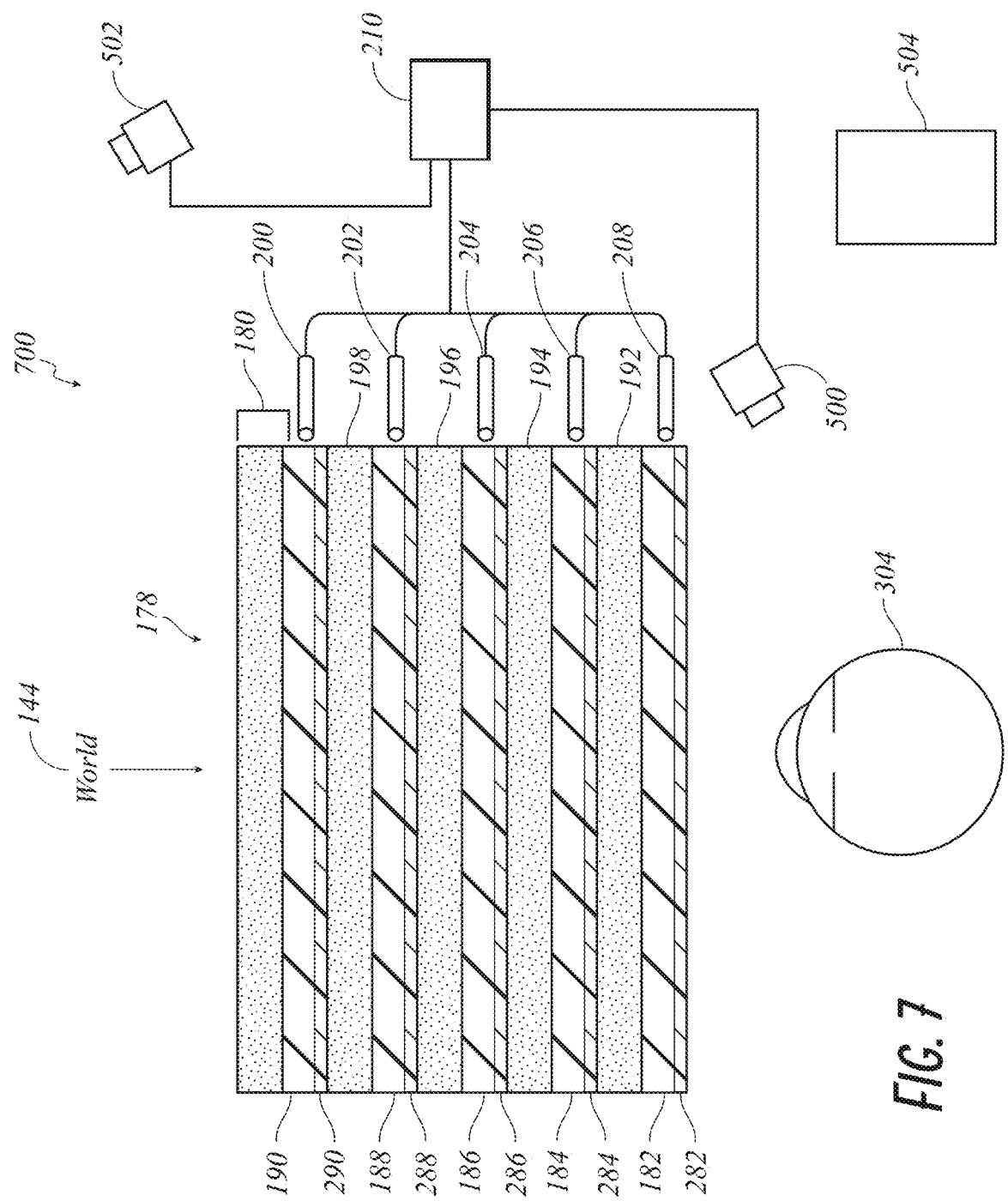
FIG. 7 illustrates an example of a waveguide stack for outputting image information to a user.

FIG. 7 illustrates an example of a waveguide stack for outputting image information to a user. A display system 700 includes a stack of waveguides, or stacked waveguide assembly, 178 that may be utilized to provide three-dimensional perception to the eye/brain using a plurality of waveguides 182, 184, 186, 188, 190. In some embodiments, the display system 700 may correspond to system 700 of FIG. 2, with FIG. 4 schematically showing some parts of that system 700 in greater detail. For example, in some embodiments, the waveguide assembly 178 may be integrated into the display 62 of FIG. 2.

With continued reference to FIG. 4, the waveguide assembly 178 may also include a plurality of features 198, 196, 194, 192 between the waveguides. In some embodiments, the features 198, 196, 194, 192 may be lenses. The waveguides 182, 184, 186, 188, 190 and/or the plurality of lenses 198, 196, 194, 192 may be configured to send image information to the eye with various levels of wavefront curvature or light ray divergence. Each waveguide level may be associated with a particular depth plane and may be configured to output image information corresponding to that depth plane. Image injection devices 200, 202, 204, 206, 208 may be utilized to inject image information into the waveguides 182, 184, 186, 188, 190, each of which may be configured to distribute incoming light across each respective waveguide, for output toward the eye 304. Light exits an output surface of the image injection devices 200, 202, 204, 206, 208 and is injected into a corresponding input edge of the waveguides 182, 184, 186, 188, 190. In some embodiments, a single beam of light (e.g., a collimated beam) may be injected into each waveguide to output an entire field of cloned collimated beams that are directed toward the eye 304 at particular angles (and amounts of divergence) corresponding to the depth plane associated with a particular waveguide.

In some embodiments, the image injection devices 200, 202, 204, 206, 208 are discrete displays that each produce image information for injection into a corresponding waveguide 182, 184, 186, 188, 190, respectively. In some other embodiments, the image injection devices 200, 202, 204, 206, 208 are the output ends of a single multiplexed display which may, e.g., pipe image information via one or more optical conduits (such as fiber optic cables) to each of the image injection devices 200, 202, 204, 206, 208.

A controller 210 controls the operation of the stacked waveguide assembly 178 and the image injection devices 200, 202, 204, 206, 208. In some embodiments, the controller 210 includes programming (e.g., instructions in a non-transitory computer-readable medium) that regulates the timing and provision of image information to the waveguides 182, 184, 186, 188, 190. In some embodiments, the controller may be a single integral device, or a distributed system connected by wired or wireless communication channels. The controller 210 may be part of the processing modules 71 or 72 (illustrated in FIG. 2) in some embodiments.

The waveguides 182, 184, 186, 188, 190 may be configured to propagate light within each respective waveguide by total internal reflection (TIR). The waveguides 182, 184, 186, 188, 190 may each be planar or have another shape (e.g., curved), with major top and bottom surfaces and edges extending between those major top and bottom surfaces. In the illustrated configuration, the waveguides 182, 184, 186,

188, 190 may each include light extracting optical elements 282, 284, 286, 288, 290 that are configured to extract light out of a waveguide by redirecting the light, propagating within each respective waveguide, out of the waveguide to output image information to the eye 304. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements 282, 284, 286, 288, 290 may, for example, be reflective and/or diffractive optical features. While illustrated disposed at the bottom major surfaces of the waveguides 182, 184, 186, 188, 190 for ease of description and drawing clarity, in some embodiments, the light extracting optical elements 282, 284, 286, 288, 290 may be disposed at the top and/or bottom major surfaces, and/or may be disposed directly in the volume of the waveguides 182, 184, 186, 188, 190. In some embodiments, the light extracting optical elements 282, 284, 286, 288, 290 may be formed in a layer of material that is attached to a transparent substrate to form the waveguides 182, 184, 186, 188, 190. In some other embodiments, the waveguides 182, 184, 186, 188, 190 may be a monolithic piece of material and the light extracting optical elements 282, 284, 286, 288, 290 may be formed on a surface and/or in the interior of that piece of material.

With continued reference to FIG. 4, as discussed herein, each waveguide 182, 184, 186, 188, 190 is configured to output light to form an image corresponding to a particular depth plane. For example, the waveguide 182 nearest the eye may be configured to deliver collimated light, as injected into such waveguide 182, to the eye 304. The collimated light may be representative of the optical infinity focal plane. The next waveguide up 184 may be configured to send out collimated light which passes through the first lens 192 (e.g., a negative lens) before it can reach the eye 304. First lens 192 may be configured to create a slight convex wavefront curvature so that the eye/brain interprets light coming from that next waveguide up 184 as coming from a first focal plane closer inward toward the eye 304 from optical infinity. Similarly, the third up waveguide 186 passes its output light through both the first lens 192 and second lens 194 before reaching the eye 304. The combined optical power of the first and second lenses 192 and 194 may be configured to create another incremental amount of wavefront curvature so that the eye/brain interprets light coming from the third waveguide 186 as coming from a second focal plane that is even closer inward toward the person from optical infinity than was light from the next waveguide up 184.

The other waveguide layers (e.g., waveguides 188, 190) and lenses (e.g., lenses 196, 198) are similarly configured, with the highest waveguide 190 in the stack sending its output through all of the lenses between it and the eye for an aggregate focal power representative of the closest focal plane to the person. To compensate for the stack of lenses 198, 196, 194, 192 when viewing/interpreting light coming from the world 144 on the other side of the stacked waveguide assembly 178, a compensating lens layer 180 may be disposed at the top of the stack to compensate for the aggregate power of the lens stack 198, 196, 194, 192 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

The display system 700 can include an outward-facing imaging system 502 (e.g., a digital camera) that images a portion of the world 144. This portion of the world 144 may be referred to as the field of view (FOV) and the imaging system 502 is sometimes referred to as an FOV camera. The entire region available for viewing or imaging by a viewer may be referred to as the field of regard (FOR). In some HMD implementations, the FOR may include substantially all of the solid angle around a wearer of the HMD, because the wearer can move their head and eyes to look at objects surrounding the wearer (in front, in back, above, below, or on the sides of the wearer). Images obtained from the outward-facing imaging system 502 can be used to track gestures made by the wearer (e.g., hand or finger gestures), detect objects in the world 144 in front of the wearer, and so forth.

The display system 700 can include a user input device 504 by which the user can input commands to the controller 210 to interact with the system 700. For example, the user input device 504 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. In some cases, the user may use a finger (e.g., a thumb) to press or swipe on a touch-sensitive input device to provide input to the system 700 (e.g., to provide user input to a user interface provided by the system 700). The user input device 504 may be held by the user's hand during use of the system 700. The user input device 504 can be in wired or wireless communication with the display system 700.

With continued reference to FIG. 4, the light extracting optical elements 282, 284, 286, 288, 290 may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 282, 284, 286, 288, 290 may be volumetric or surface features, which may be configured to output light at specific angles. For example, the light extracting optical elements 282, 284, 286, 288, 290 may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety. In some embodiments, the features 198, 196, 194, 192 may not be lenses. Rather, they may simply be spacers (e.g., cladding layers and/or structures for forming air gaps).

In some embodiments, the light extracting optical elements 282, 284, 286, 288, 290 are diffractive features that form a diffraction pattern, or "diffractive optical element" (also referred to herein as a "DOE"). Preferably, the DOEs have a relatively low diffraction efficiency so that only a portion of the light of the beam is deflected away toward the eye 304 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes and/or depth of field may be varied dynamically based on the pupil sizes and/or orientations of the eyes of the viewer. In some embodiments, the display system 700 also includes an inward-facing imaging system (e.g. a digital camera) 500, which observes the movements of the wearer, such as the eye movements and the facial movements. The inward-facing imaging system 500 (e.g., a digital camera) may be used to capture images of the eye 304 to determine the size and/or orientation of the pupil of the eye 304. The inward-facing imaging system 500 can be used to obtain images for use in determining the direction the wearer 60 is looking (e.g., eye pose) or for biometric identification of the wearer (e.g., via iris identification). In some embodiments, the inward-facing imaging system 500 may be attached to the frame 64 (as illustrated in FIG. 2) and may be in electrical communication with the processing modules 71 and/or 72, which may process image information from the camera 500 to determine, e.g., the pupil diameters and/or orientations of the eyes of the user 60. In some embodiments, at least one camera 500 may be utilized for imaging each eye, to separately determine the pupil size and/or eye pose of each eye independently, thereby allowing the presentation of image information to each eye to be dynamically tailored to that eye. In some other embodiments, the pupil diameter and/or orientation of only a single eye 304 is determined (e.g., using only a camera 500 per pair of eyes) and the eye features determined for this eye are assumed to be similar for the other eye of the viewer 60. The images obtained from the inward-facing imaging system 500 may be used to obtain images for substituting the region of the wearer's face occluded by the HMD, which can be used such that a first caller can see a second caller's unoccluded face during a telepresence session. The display system 700 may also determine head pose (e.g., head position or head orientation) using sensors such as IMUs, accelerometers, gyroscopes, etc. The head's pose may be used alone or in combination with gaze direction to select and move virtual objects.

Depth of field may change inversely with a viewer's pupil size. As a result, as the sizes of the pupils of the viewer's eyes decrease, the depth of field increases such that one plane not discernible because the location of that plane is beyond the depth of focus of the eye may become discernible and appear more in focus with reduction of pupil size and commensurate increase in depth of field. Likewise, the number of spaced apart depth planes used to present different images to the viewer may be decreased with decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size and/or orientation, or upon receiving electrical signals indicative of particular pupil sizes and/or orientations. For example, if the user's eyes are unable to distinguish between two depth planes associated with two waveguides, then the controller 210 may be configured or programmed to cease providing image information to one of these waveguides. Advantageously, this may reduce the processing burden on the system, thereby increasing the responsiveness of the system. In embodiments in which the DOEs for a waveguide are switchable between on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

Additional Aspects

In a 1st aspect, a texture projecting light bulb is described. The texture projecting light bulb comprises an incandescent filament configured to produce infrared light, an integrating sphere enclosing the incandescent filament, and a light bulb enclosure surrounding the integrating sphere. The integrating sphere comprises a diffusely reflective interior surface and an aperture configured to allow light to pass out of the integrating sphere. The enclosure comprises one or more regions transmissive to infrared light and one or more regions opaque to infrared light. The one or more transmissive regions are configured to project a structured light pattern of infrared light detectable by a computer vision system.

In a 2nd aspect, a texture projecting light bulb is described. The texture projecting light bulb comprises a light source, an integrator surrounding the light source, and an enclosure surrounding the integrator. The integrator comprises an interior surface and at least one aperture. At least a portion of the enclosure is translucent.

In a 3rd aspect, the texture projecting light bulb of aspect 2, wherein the light source is configured to produce infrared light.

In a 4th aspect, the texture projecting light bulb of any one of aspects 1-3, wherein the light source is configured to produce visible light.

In a 5th aspect, the texture projecting light bulb of any one of aspects 1-4, wherein the light source is configured to produce a combination of infrared and visible light.

In a 6th aspect, the texture projecting light bulb of any one of aspects 2-5, wherein the integrator comprises an integrating sphere.

In a 7th aspect, the texture projecting light bulb of any one of aspects 2-6, wherein the integrator comprises an integrating cube.

In an 8th aspect, the texture projecting bulb of any one of aspects 2-7, wherein the interior surface of the integrator comprises a specularly reflective material.

In a 9th aspect, the texture projecting bulb of any one of aspects 2-8, wherein the interior surface of the integrator is at least partially coated with a specularly reflective coating.

In a 10th aspect, the texture projecting bulb of any one of aspects 2-9, wherein the interior surface of the integrator comprises a diffusive material.

In an 11th aspect, the texture projecting bulb of any one of aspects 2-10, wherein the interior surface of the integrator is at least partially coated with a diffusive coating.

In a 12th aspect, the texture projecting bulb of any one of aspects 2-11, wherein the extended light source comprises an incandescent filament.

In a 13th aspect, the texture projecting bulb of any one of aspects 2-12, wherein the extended light source comprises a light-emitting diode.

In a 14th aspect, the texture projecting bulb of any one of aspects 2-13, wherein the extended light source comprises a gas-discharge element.

In a 15th aspect, the texture projecting bulb of any one of aspects 2-14, wherein the extended light source comprises an arc light.

In a 16th aspect, the texture projecting bulb of any one of aspects 1-15, wherein at least a portion of the enclosure comprises a hot mirror.

In a 17th aspect, the texture projecting bulb of any one of aspects 1-16, wherein at least a portion of the enclosure is opaque.

In an 18th aspect, the texture projecting light bulb of any one of aspects 1-17, wherein at least a portion of the interior surface of the enclosure is capable of absorbing light.

In a 19th aspect, the texture projecting light bulb of any one of aspects 2-18, wherein the translucent portion of the enclosure is configured to project a structured light pattern.

In a 20th aspect, the texture projecting light bulb of any one of aspects 1-19, wherein at least a portion of the enclosure is spherical.

In a 21st aspect, the texture projecting light bulb of aspect 20, wherein the aperture of the integrator is located at the center of the spherical portion of the enclosure.

In a 22nd aspect, the texture projecting light bulb of any one of aspects 1-21, wherein the light bulb further comprises a base configured to be mechanically and electrically connected to a light bulb socket.

In a 23rd aspect, the texture projecting light bulb of aspect 22, wherein the base comprises a threaded base.

In a 24th aspect, the texture projecting light bulb of any one of aspects 2-23, wherein the light bulb further comprises a baffle disposed at least partially within the integrator.

In a 25th aspect, the texture projecting light bulb of aspect 24, wherein at least a portion of the baffle is located along a straight line path between the light source and the aperture.

In a 26th aspect, the texture projecting light bulb of any one of aspects 24-25, wherein the baffle intersects every straight line path between the light source and the aperture.

In a 27th aspect, the texture projecting light bulb of any one of aspects 24-26, wherein the baffle comprises a specularly reflective surface.

In a 28th aspect, the texture projecting light bulb of any one of aspects 24-27, wherein the baffle comprises a diffusely reflective surface.

In a 29th aspect, an augmented reality system is described. The augmented reality system comprises a wearable display system and a texture projecting light bulb. The wearable display system comprises a head-mounted display configured to project light to a user to display augmented reality image content, and an outward-facing imaging system configured to image the world around the user. The texture projecting light bulb is configured to project a textured light pattern. The wearable display system is configured to detect the textured light pattern projected by the texture projecting light bulb. The texture projecting light bulb is the texture projecting light bulb of any one of aspects 1-28.

In a 30th aspect, the augmented reality system of aspect 29, wherein the head-mounted display is configured to display augmented reality image content based at least in part on the textured light pattern detected by the wearable display system.

In a 31st aspect, the augmented reality system of any one of aspects 29-30, wherein the head-mounted display comprises a waveguide configured to allow a view of the world through the waveguide and project light to the user by directing light out of the waveguide and into an eye of the user.

In a 32nd aspect, the augmented reality system of aspect 31, wherein the waveguide is part of a stack of waveguides, wherein each waveguide of the stack is configured to output light with different amounts of divergence in comparison to one or more other waveguides of the stack of waveguides.

In a 33rd aspect, the augmented reality system of any one of aspects 29-32, wherein the head-mounted display comprises a light field display.

In a 34th aspect, the augmented reality system of any one of aspects 29-33, wherein the outward-facing imaging system is configured to detect infrared light.

In a 35th aspect, a display system comprises an augmented reality display system, a virtual reality display system, or a computer vision system, and the texture projecting light bulb of any one of aspects 1-28. The augmented reality system can comprise the augmented reality system of any one of aspects 29-34.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A light bulb comprising:
a light source;
an integrator surrounding the light source, the integrator comprising an interior surface and at least one aperture; and
an enclosure surrounding the integrator, wherein at least a portion of the enclosure is translucent;
wherein the integrator is disposed within an interior of the enclosure such that the at least one aperture is spaced from the enclosure, and
wherein the light bulb is configured to project a structured light pattern.

2. The light bulb of claim 1, wherein the light source is configured to produce both infrared light and visible light.

3. The light bulb of claim 1, wherein the light source includes a first light source that produces infrared light and a second light source that produces visible light.

4. The light bulb of claim 1, wherein the integrator comprises an integrating sphere.

5. The light bulb of claim 4, wherein the integrating sphere has a sphere multiplier of 5 or more.

6. The light bulb of claim 1, wherein the interior surface of the integrator comprises a specularly reflective material or is coated with a specularly reflective coating.

7. The light bulb of claim 1, wherein the interior surface of the integrator comprises a diffusive material or is coated with a diffusive coating.

8. The light bulb of claim 1, wherein the enclosure comprises a spherical portion, and wherein the at least one aperture is disposed at a geometric center of the spherical portion of the enclosure.

9. The light bulb of claim 1, further comprising at least one baffle disposed within the integrator.

10. The light bulb of claim 1, further comprising a pattern generating element.

11. The light bulb of claim 10, wherein the pattern generating element comprises at least a portion of the enclosure that is non-transmissive to infrared light.

12. The light bulb of claim 11, wherein the at least a portion of the enclosure that is non-transmissive to infrared light comprises a hot mirror transmissive to visible light and reflective to infrared light.

13. The light bulb of claim 11, wherein the at least a portion of the enclosure that is non-transmissive to infrared light comprises a material capable of absorbing infrared light.

14. The light bulb of claim 10, wherein the pattern generating element comprises a structure disposed adjacent to an interior surface of the enclosure.

15. The light bulb of claim 10, wherein the pattern generating element comprises a structure disposed within and spaced from the enclosure.

16. The light bulb of claim 1, wherein the light source is configured to produce infrared light, the light bulb further comprising a second light source configured to produce visible light, the second light source being disposed outside the integrator.

17. The light bulb of claim 1, further comprising a base portion coupled to the enclosure and configured to be mechanically and electrically connected to a light bulb socket.

18. The light bulb of claim 17, wherein the at least one aperture is disposed on a side of the integrator opposite the base portion.

19. The light bulb of claim 17, wherein the enclosure is a flood light-type enclosure, and wherein the integrator is disposed adjacent to the base portion.

20. The light bulb of claim 1, wherein the at least one aperture comprises a first aperture and a second aperture disposed on an opposite side of the integrator from the first aperture.

21. The light bulb of claim 1, further comprising a second light source and a second integrator, the second integrator disposed within the enclosure and surrounding the second light source.

* * * * *